3,321,908
MECHANOCHEMICAL ENGINE

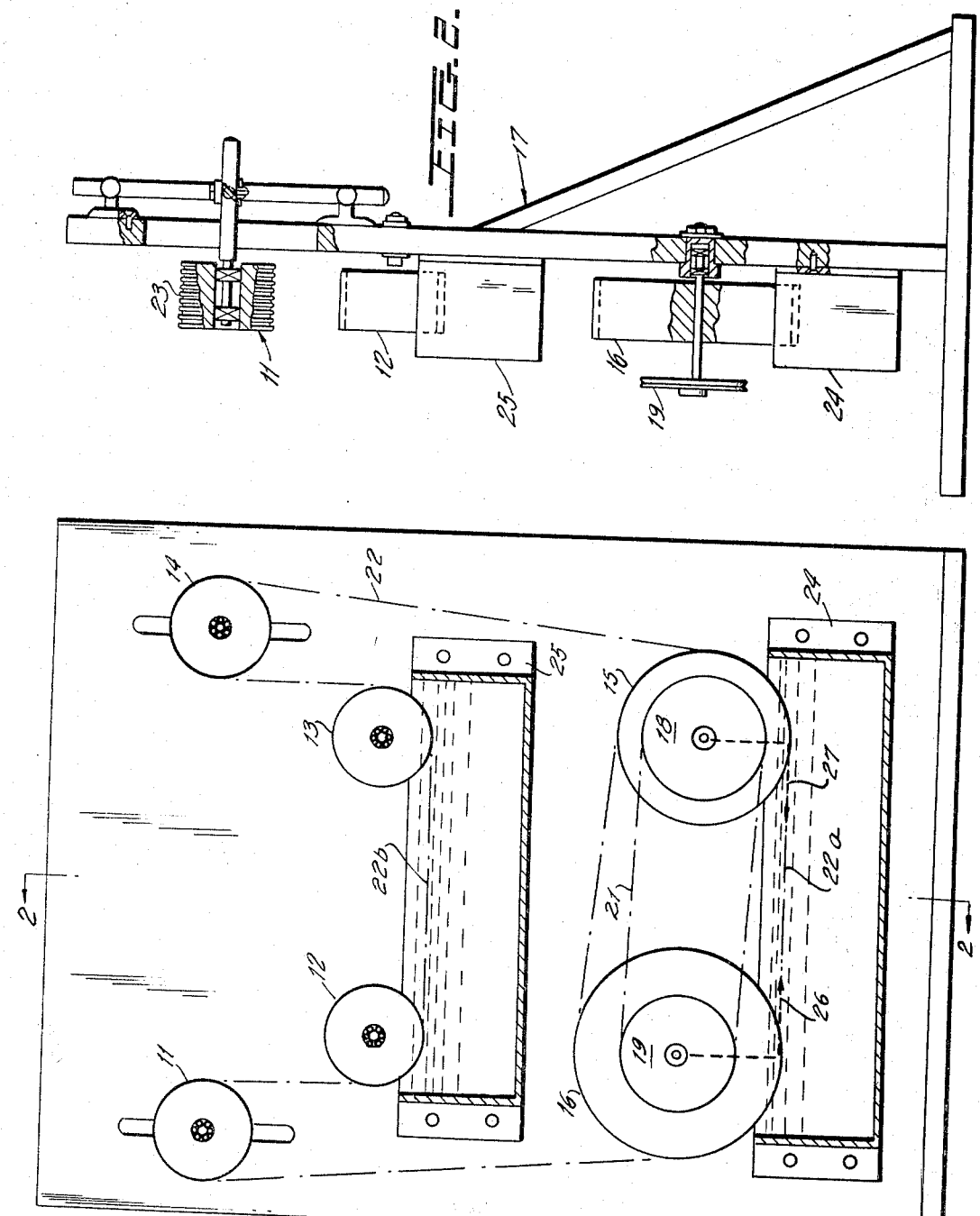

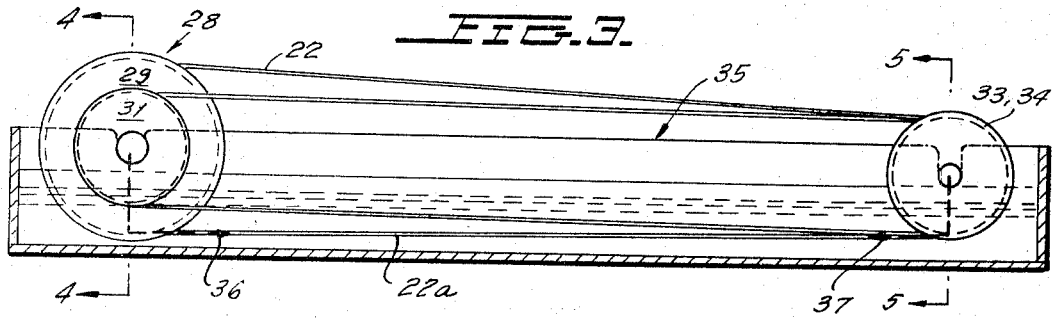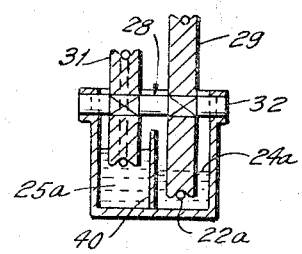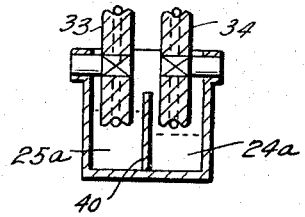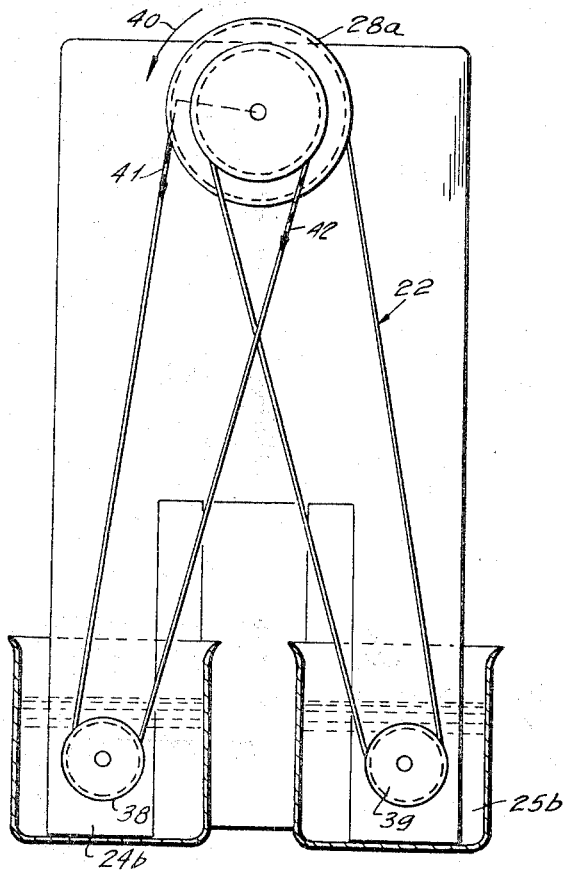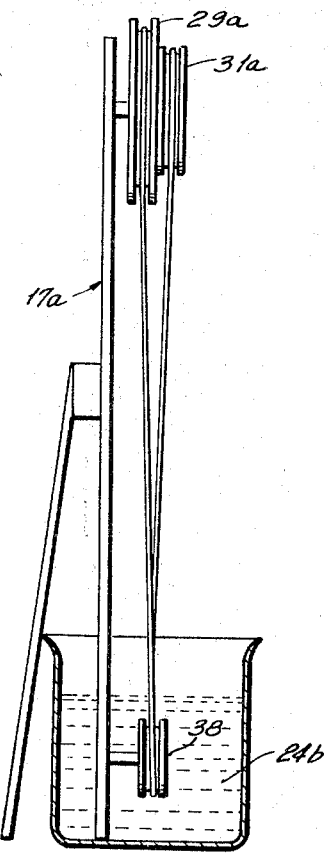

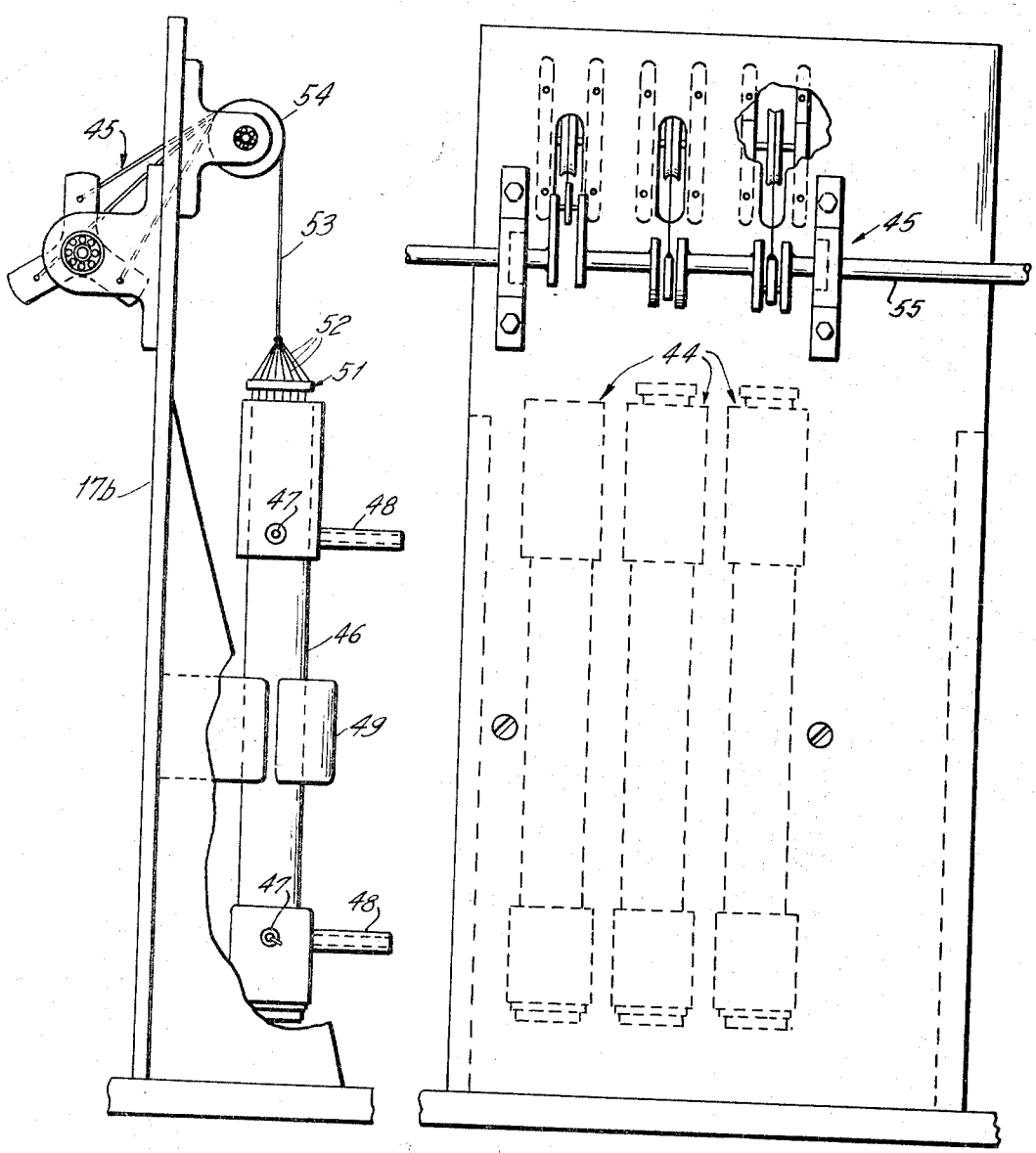

Aharon Katchalsky, Tel-Aviv, Itzhak Z. Steinberg and Avraham Oplatka, Rehovoth, and Amir Kam, Holon, Israel, assignors to Weizmann Institute of Science, Rehovoth, Israel, a company of Israel
Filed Oct. 22, 1965, Ser. No. 500,726
12 Claims. (Cl. 60—1)

This invention relates to a device for effecting the conversion of chemical energy to mechanical energy, without the necessity for intermediate energy transformations.

In the following specification all parts and percentages are given by weight, unless otherwise indicated.

Prior hereto most devices for converting chemical energy into mechanical energy have involved energy transformations through intermediate forms, such as heat (e.g., in steam engines, internal combustion engines or rockets) or electrical energy (e.g., in combinations of electrochemical cells and electric motors). Hence, in a steam engine, the chemical energy stored in coal is first converted to thermal energy by burning in air. The heat evolved may then be utilized for the evaporation of liquid water and the vapor produced pushes pistons which are connected eccentrically to wheels. In the case of the steam engine, two energy transformations thus occur; chemical energy into heat and heat into mechanical motion of the wheels.

Energy losses accompany each energy transformation so that it would be useful to decrease the number of such transformations. Ideally, therefore, it would be desirable to directly convert chemical energy into mechanical energy.

It is known that certain reactive macromolecular substances possess contractile characteristics which, like animal muscle and bacterial flagella, may produce direct "mechanochemical" coupling, i.e., undergo appreciable dimensional changes on combining with reactive substances and, conversely, may sustain appreciable mechanical stresses and thereby induce correlative chemical change. Such contractile materials have been described, for example, in the following publications:

"Muscle as a Machine" by A Katchalsky and S. Lifson, Scientific American, vol. 190, No. 3, pp. 72 et seq. (March 1954);

"Mechanochemistry and Ion Exchange" by A. Katchalsky and M. Zwick, Journal of Polymer Science, vol. XVI, pp. 221–234 (1955);

"Elementary Mechanochemical Processes" by A. Katchalsky, S. Lifson, I. Michaeli, and M. Zwick, in "Contractile Polymers," Pergamon Press, 1960, pp. 1–40 (1960);

Mandelkern et al., U.S. Patent No. 3,090,735, granted May 21, 1963.

It has been proposed, e.g., in the aforesaid Scientific American publication, to utilize the contractility of such macromoleculer substances to do mechanical work. It has further been suggested in Nature (London), vol. 171, p. 213 (1953), to provide a mechanochemical engine making use of the sequential contractions and relaxations of such materials. In the device described, a wheel having a plurality of spokes constituted of a contractile material is said to have been suspended in a trough filled to the level of the wheel axle with a concentrated salt solution, and above that with a very dilute solution. Contraction of the lower spokes immersed in the concentrated solution is said to have occurred, placing the wheel in imbalance, and effecting rotation thereof. In this manner, the device is said to have produced a complete rotation of the wheel in about 20 minutes.

Unfortunately, the device thus described can neither operate for prolonged periods nor with any efficiency of operation. Hence, upon diffusion of the salt content from the region of greater concentration into the more dilute phase, the differential salt content required to effect the sequential contraction and relaxation of the contractile spokes would cease, thereby terminating operation in short order, irrespective of the degree of energy conversion initially effected. It is, in fact, apparent that the device described could not be utilized for the production of useful work.

It is among the objects of the present invention to provide a mechanochemical engine for effecting the direct conversion of chemical energy to mechanical energy, making use of the contractile characteristics of macromolecular materials.

A further object of the invention is to provide such an engine, the magnitude of energy conversion, and the efficiency, of which is such that it may serve to produce useful work.

Yet an additional object of the invention is to provide such an engine which may, if desired, be employed for the transfer of chemicals against their concentration gradient, i.e., for the desalination of sea water or of brackish water, by the investment of mechanical energy.

The nature and objects of the invention will be more fully apparent from a consideration of the following detailed description thereof.

In its broadest sense, the present invention is directed to a device for effecting the direct conversion of chemical energy to mechanical energy, which includes sources for first and second reactant-containing fluids, and a working member comprising at least one polymeric, linearly oriented element constituted of a sub-microscopic gel network of long chain, cross-linked molecules, which element, when contacted by the first fluid, exhibits a first reversible dimensional change and, when contacted by the second fluid, exhibits a second reversible dimensional change opposite in direction to the first dimensional change. The device also includes mechanism for independently and intermittently contacting the polymeric element with the first and second fluids, and a member, connected to the working member, for converting the first and second oppositely directed dimensional changes of the polymeric element to continuous rotary motion and, conversely, for converting rotary motion impressed thereon to such dimensional changes of the polymeric element.

By providing a device including mechanism for independently and intermittently exposing the macromolecular material to a pair of fluids designed to produce contraction and relaxation thereof, respectively, and by providing structure connected to the macromolecular material for converting its dimensional changes to continuous rotary motion or, conversely, for converting continuous rotary motion to such dimensional changes, a continuously acting, closed cycle mechanochemical engine is provided. The mechanochemical engines of the present invention transform chemical energy into mechanical energy by means of elastic, contractile, fibrilar systems as in contracting muscles, whereas in conventional chemical engines, e.g. internal combustion engines or steam engines, the "converter" is always an elastic, compressible vapor or gas. The mechanochemical engines of the present invention thus extend the realm of utilizable fuels, permitting the consideration, as fuel sources, of many materials and chemical reactions not heretofore so employed.

While, as will be understood, the power produced by the use of a single fiber, or membrane, of such a macromolecular material is relatively small it is possible, by increasing the number of fibers, fabrics or films employed in such a device, otherwise scaling-up the dimensions of the device, and/or by utilizing chemical reactions capable of large free energy changes, to produce practical power outputs therefrom.

The mechanochemical engines of the present invention may be utilized for the economical performance of versatile tasks which do not impose high-power requirements and which cannot readily be performed by conventional devices. Mechanochemical engines of the type described herein may suitably be employed for the operation and control of delicate instruments in isolated scientific research stations, in meterological balloons, or in space ships or satellites. Moreover, when such engines are subjected to a rotary mechanical input, contractile or extensile forces are imparted to the macromolecular materials, and the materials may be utilized to stimulate the transfer of chemical reagents between various baths, against their concentration gradient. In this manner, it is possible to effect the desalination of sea water or other brackish waters.

The macromolecular contractile materials hereof may be moved relative to the reagent-containing fluids with which they are successively contacted or, conversely, such fluids may be sequentially fed through the porous macromolecular substances to produce the successive mechanical dimensional changes thereof.

In accordance with a first form of the invention, a device is provided for effecting the former type of operation, which device includes at least two rotatable pulley elements having differing diameters, and a plurality of polymeric, linearly oriented fibrous elements wound endlessly thereon. By winding the macromolecular contractile polymeric material about such pulley elements, as discussed more fully hereinafter, it is possible to produce a net moment about the pulley or pulleys incorporating the same, thereby moving the endless polymeric material successively through the pair of chemical actuating fluids and producing a continuous rotary output.

By so proceeding, it is possible to eliminate the necessity for pumping such fluids to and from the fibrous material itself. Pumping energy is thereby conserved, and the need for special mechanism for regulating the input and output rates of the treating fluids, relative to the degree of fibrous material contraction or relaxation, is obviated. Finally, by providing for the continuous movement of the macromolecular material from one actuating fluid to the other, losses in chemical energy due to mixing of the treating fluids are minimized.

The polymeric, linearly oriented elements useful in the present invention comprise, as indicated above, submicroscopic gel networks of long chain, cross-linked molecules having substituents which entrap, or react with, substances dissolved or otherwise dispersed in the fluids permeated through the macromolecular material. As indicated hereinafter, a wide variety of macromolecular materials and actuating fluids, employing a number of reaction mechanisms, may be utilized to convert the chemical energy of the actuating fluid to mechanical energy, expressed in the sequential contraction and relaxation of the macromolecular material, or, conversely, to utilize such mechanical energy to effect chemical transfer from one to the other of the actuating fluids, against their concentration gradient.

In general, those polymeric materials which convert chemical forces between reaction groups into contractile forces in a gel network, and are therefore useful in the practice of the present invention, may be classified in the following categories: polyelectrolytes, reversibly meltable and crystallizable polymers, reversibly swellable polymers, or other polymers which reversibly change their linear dimensions as a result of chemical reactions, e.g., by oxidation-reduction reactions.

The polyelectrolytes are herein defined as those polymers of the class described which change their degree of ionization, and consequently their dimensions, by contact with appropriate neutralizing agents. The uncharged polyelectrolyte molecules, like other random thread-like molecules, coil up freely under the impact of thermal motion. However, when such a molecule is ionized, the groups of atoms along its chain length strongly repel one another, the repulsive forces tending to stretch and straighten the molecule. The stretching force can be increased by chemically increasing the degree of ionization of the polyelectrolyte, whereas the coiling or contractile force may be increased by reducing such ionization. Hence, in the case of polyacids, the thread-like molecules may undergo reversible contraction and relaxation by the addition of acids and bases, in accordance with the following reactions:

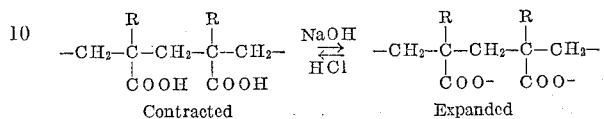

Contracted   Expanded

Polyacids which act in this manner include vinylic group-containing polymers such as polyacrylic acid, polymethacrylic acid, polyvinyl alcohol phosphates, and copolymers thereof, e.g., copolymers of polyacrylic acid and polyvinyl alcohol; acid substituted styrene derivatives such as polyvinyl benzoic acid; copolymers of the krillium type containing the repeating group

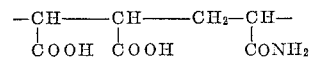

and interpolymers of polyvinyl alcohol with the copolymer of maleic anhydride and vinyl acetate in which about one-third of the carboxyl groups have been neutralized with calcium.

Similarly, aliphatic and aromatic polybases may be employed as polyelectrolytes in the device of the present invention. Such macromolecular bases include, for example, polyvinyl amine, polyvinyl pyridine, polyvinyl piperidine, and substituted styrene derivatives such as polyamino styrene.

The polyacids and polybases are desirably contacted with stronger acids and bases, respectively, to effect the reversible dimensional changes desired in accordance herewith. Hence, in the case of polymethacrylic acid, for example, the sequential contraction and relaxation may be effected by contacting the polymeric gel network first with a strong acid, e.g., HCl or $H_2SO_4$ and then with a strong base, e.g., NaOH. In the case of a polybase, such as polyvinyl amine, the sequential contraction and relaxation may be effected by contacting the polymeric material first with a strong base, e.g., NaOH, and thereafter with an acid, e.g., HCl.

Additionally, polyampholytes formed by the copolymerization of both acidic and basic monomers and which are contracted at the isoelectric point and expanded on both the acidic and alkaline sides of such point, may be utilized as polyelectrolytes. Materials thus useful include, inter alia, copolymers of acrylic acid with vinyl pyridine or vinyl piperidine.

Other known materials act as polyelectrolytes under certain conditions. Hence, polyamides of the nylon-6/6 or nylon-6 type become polyelectrolytic upon dissolution in formic acid, and may contract and expand reversibly in such state.

It has also been found that contractile polymeric materials may be provided making use of ion exchange phenomena. Hence, if one treats a charged polyelectrolyte (whether weak or strong, partially or fully ionized) with a divalent counter ion, an ion exchange takes place in accordance with the following reaction:

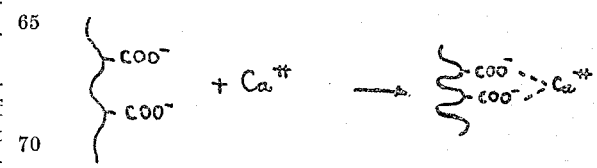

When the ion exchange is effective on over 80% of the ionized fixed groups a violent contraction takes place. Such contraction is reversible and may be repeated numerous times.

There are indications that various biological systems are also based on the ion exchange of univalent and divalent ions; in fact, contractility of uni-cellular organisms such as Vorticella has been shown to be produced by ion exchange phenomena. It is believed that this type of contractility is based upon reversible cross linking of the charged macromolecules, with the divalent ions acting as bridges between the polymeric molecules.

It is believed that the cross linking brings the macromolecules into closer proximity, diminishes the volume of the gel or fiber and results in a macroscopic contraction. From another point of view the contraction by divalent ions, e.g., $Ca^{++}$, $Ba^{++}$ or $Sr^{++}$, may be considered a precipitation reaction or a phase transition. Thus, such reaction may be considered in the same category as either the reactions of polyelectrolytes or the reactions of the reversibly meltable and crystallizable polymers discussed hereinafter.

A further category of applicable macromolecular materials, i.e., the reversibly meltable and crystallizable polymers, is herein defined as those materials which are found to melt on interaction with various reagents or solvents and crystallize on contact with other reagents or solvents. In this group may be classified the various natural fiber-forming proteins containing the peptide linkage, e.g., keratin and collagen, which are found in hair, wool, and animal tendons, respectively.

In the case of collagen fibers, a particularly preferred macromolecular substance suitable for use in the present invention, the collagen macromolecules are arranged parallel to the fiber axes in a helical configuration. When exposed to solutions of certain salts, e.g., lithium bromide, potassium thiocyanate, magnesium chloride, or mercury-potassium iodide, the helical structure is broken down and the cross-linked macromolecular chains coil up, contracting the fiber. If the reagent is thereafter washed from the collagen fiber, e.g., by immersion in pure water, the helical structure is reformed and the fiber relaxes and re-elongates.

The preferred collagen material employed in the mechanochemical engines of this invention may be prepared, for example, from sheep submucose treated with carbonate and a chelating agent, such as the sodium salt of ethylene diamine tetracetic acid, or one may use chrome-formaldehyde tanned 6/0 catgut or re-constituted collagen fibers.

In addition to the salts specified above, the natural fibrous proteins, such as collagen and keratin, may produce reversible dimensional changes when treated with acids or bases, or with numerous organic reagents such as urea or salicylic acid.

There are in addition numerous crystallizable fiber-forming synthetic polymers which may be employed in the mechanochemical engines hereof, such as, for example, the polyamides, such as nylons of different types; the polyesters such as polyethylene terephthalate; polyacrylonitrile polymers; or fibrous polyethylenes (see, for example, the aforesaid U.S. Patent No. 3,090,735). These materials, like the natural fibrous proteins described above, melt upon interaction with numerous reagents and organic solvents and crystallize upon contact with other reagents or non-solvents.

The third category of useful macromolecular materials, the swellable polymers, is herein defined as those polymers which change their dimensions upon the addition of reagents that modify the solubility of the macromolecules. Low molecular substances which reduce solubility generally cause contraction, whereas solubilizing factors cause relaxation and expansion of the macromolecules. Included in this category are natural and synthetic rubbers and polyvinyl chloride.

The fourth category of useful macromolecular materials, the chemically interacting polymers, is herein defined as those polymers which change their dimensions upon the addition of reagents that modify the chemical nature of the macromolecules without necessarily changing their electrostatic charge or potential. The change in chemical nature might involve, for example, oxidation, reduction, esterification, hydrolysis, cross-linking etc. A chemical reaction of the polymer with one or more reagents, accompanied by change in dimensions, will be followed by another chemical reaction changing the dimensions in the opposite direction. Thus, for example, oxidation of an oxidizable polymer by a suitable oxidizing agent will alternate with reduction with a proper reducing agent.

It should be stressed that a polymeric compound could belong to more than one of the above mentioned categories. Thus, as already mentioned, nylon-66 would behave as a polyelectrolyte in formic acid, whereas it enters the second category when in LiBr solution.

It will be understood that the mechanisms postulated above for the mechanochemical changes of the several classes of macromolecular materials discussed are not intended as limiting of the present invention, but rather as a likely explanation in the light of present knowledge.

Preferred embodiments of the mechanochemical engines of this invention are described hereinafter in connection with the accompanying drawings, in which:

FIGURE 1 is a front elevation of a particularly preferred form of the device of the invention;

FIGURE 2 is a vertical section through the embodiment of FIGURE 1, viewed in the direction of the line 2—2 in the latter figure;

FIGURE 3 is a side elevation of a further embodiment;

FIGURE 4 is a vertical section through one pair of pulley members of the device of FIGURE 3, viewed along line 4—4 thereof;

FIGURE 5 is a vertical section through the second pair of pulley members of the device of FIGURE 3, viewed along line 5—5;

FIGURE 6 is a front elevation of a further embodiment of the invention;

FIGURE 7 is a side elevation of the device shown in FIGURE 6;

FIGURE 8 is a side elevation of another embodiment of the invention, in which the actuating fluid is fed through the porous structure of a plurality of stationary macromolecular material elements; and FIGURE 9 is a rear elevation of the device shown in FIGURE 8, detailing the construction of the crankshaft assembly thereof.

Turning to the drawings, the preferred embodiment shown in FIGURES 1 and 2 includes pulley wheels 11 to 16, inclusive, rotatably supported by a stand, generally indicated at 17. The main pulley wheels 15 and 16, having differing diameters, are coaxially mounted with, and engage, transmission discs 18 and 19, respectively, which discs are connected in driving relation by an endless, inelastic coupling fiber 21.

A bundle 22 of macromolecular contractile fibers passes endlessly over the several pulley wheels, each fiber passing through a guide groove 23 formed on the circumference of each pulley wheel (see the grooves defined in wheel 11 in FIGURE 2, in which the fiber bundle 22 has not been shown, for purposes of clarity).

A pair of receptacles 24 and 25 are mounted to stand 17, so disposed relative to pulley wheels 15 and 16, and 12 and 13, respectively, that segments 22a and 22b of the fiber bundle pass through the liquids contained within receptacles 24 and 25, respectively. If desired, means may, of course, be supplied for independently flowing the actuating solutions through receptacles 24 and 25, either intermittently or continuously.

If, for example, the bundle of macromolecular fibers 22 is constituted of mono- or multi-filament collagen fibers, an aqueous salt solution, e.g., containing lithium bromide, is conveniently fed through receptacle 24, and pure water through receptacle 25. A contractile force is thereby developed in segment 22a of the collagen fiber bundle immersed in the salt solution within receptacle 24. Such force acts upon pulley wheels 15 and 16, tending to rotate wheel 15 clockwise and wheel 16 counter-clockwise. However, since, as illustrated, pulley wheel 16 has a greater diameter than wheel 15, the counter-clockwise torque or moment 26 produced about wheel 16 is greater than the clockwise moment or torque 27 produced about wheel 15, resulting in a net counter-clockwise moment.

For the sake of simplicity, it has been assumed that the transmission discs 18 and 19 are of equal radii. As these discs are coupled by the inelastic coupling fiber 21, it is evident that the system of pulley wheels will then rotate in the direction of the algebraic sum of the moments on pulley wheels 15 and 16. It should be noted that the pulley wheels 15 and 16 have been assumed to be of different diameter and the transmission discs 18 and 19 of the same diameter for the sake of illustration only. Other combinations are of course possible; hence, wheels 15 and 16 may be of equal diameter, with discs 18 and 19 differing in diameter. Alternatively, all four elements (15, 16, 18 and 19) may differ from one another in diameter, if so desired.

Counter-clockwise rotation of the several pulley wheels drives the collagen bundle 22 such that "fresh" collagen fiber segments continuously enter the salt solution. The effect of the contraction of the collagen bundle is counter-balanced by the fact that less contracted fiber is removed from the solution in receptacle 24 by pulley wheel 15 than is introduced into such solution by the larger pulley wheel 16.

Employing an 8 Molar aqueous solution of lithium bromide as the fluid fed through receptacle 24, and pure water as the fluid fed through receptacle 25, and utilizing 3–11 collagen "multi-filament" fibers 22, an experimental device has been devised in which continuous movement of the collagen bundle is effected at a rate of 20 cm. per second.

The further embodiment illustrated in FIGURES 3 to 5, inclusive, incorporates a compound pulley 28 having a larger diameter sheave or pulley wheel 29 and a smaller diameter sheave or pulley wheel 31 mounted on a common axis 32, and a pair of uncoupled pulley wheels 33 and 34, all of which are mounted for rotation within a trough-like chamber 35. The chamber 35 is divided into a pair of longitudinally extending receptacles 24a and 25a by a partition 40 extending lengthwise of the chamber; and a macromolecular fiber bundle 22 is threaded over the respective pulley wheels. In this embodiment it will also be noted that the receptacles 24a and 25a extend the entire distance between compound pulley 28 and pulley wheels 33 and 34; such construction facilitates prolonged contact between the fiber bundle 22 and the liquids contained within the respective receptacles.

Referring to the segment 22a of the fiber bundle passing through the salt solution in receptacle 24a of the device of FIGURES 3–5, it will be seen that, as described in connection with the embodiment of FIGURES 1 and 2, a counter-clockwise moment 36 is produced about the compound pulley 28 which is larger than the clockwise moment 37 produced about pulley wheel 34, thereby producing a net counter-clockwise moment and consequent counter-clockwise rotation of the several pulley wheels.

In this case, when the aqueous salt solution fed through receptacle 24a was a 7 Molar aqueous solution of lithium bromide, water was fed through receptacle 25a and a collagen fiber bundle was employed, a continuous rotary movement of the compound pulley 28 (having a radius of 50 mm.) was produced at a speed of 13 r.p.m.

Referring now to the embodiment illustrated in FIGURES 6 and 7, a further compound pulley 28a is illustrated, composed of pulley segments or sheaves 29a and 41a, and mounted to a stand 17a.

The device further incorporates pulley wheels 38 and 39 disposed within receptacles 24b and 25b, respectively, adapted to be immersed in actuating fluids fed into or through the receptacles. The endless macromolecular fiber bundle 22, constituted of collagen, for example, is wound about the several pulley members, as indicated in the drawing.

When a concentrated salt solution is fed into receptacle 24b, the collagen fibers immersed within the solution therein contract, exerting equal contractile forces on the rims of sheaves 29a and 31a. However, as indicated above in connection with the preceding embodiments of the invention, since the diameter of sheave 29a is greater than the diameter of sheave 31a, the counter-clockwise moment 41 produced about sheave 29a is greater than the clockwise moment 42 produced about sheave 31a. The pulley system, therefore, rotates in a counter-clockwise direction, as indicated by arrow 40 in FIGURE 6.

Since the several pulley wheels drivingly engage the collagen bundle 22, the latter is driven unidirectionally thereby. In this manner, "fresh" collagen fiber segments continuously enter the salt solution within receptacle 24b wherein they are sequentially contracted. The effect of such contraction is counter-balanced by the fact that, with each revolution of the compound pulley 28a, a longer segment of fiber is introduced into the salt solution in receptacle 24b by sheave 29a than is removed therefrom by sheave 31a. In a properly planned machine, the amount of contraction due to the chemical reaction is equal to or greater than the net length of collagen fiber introduced by the compound pulley 28a. Such can be achieved by choosing the proper diameter ratio of sheaves 29a and 31a.

The reverse procedure takes place at pulley 39, which may be immersed in water or a dilute salt solution, for example, to effect relaxation of the fiber.

While the engine is working, the salt incorporated within the solution fed to receptacle 24b is partially absorbed by the collagen bundle 22 and transferred from that receptacle to receptacle 25b. The free energy change associated with the salt transfer from the high concentration solution to the low concentration solution is that which is transformed into the mechanical work which may be obtained from the rotary movement of the pulley wheels. Means for continuously or intermittently supplying fresh fluids to receptacles 24b and 25b may, as previously indicated, be provided to facilitate continuous operation of the device. Alternatively, if no further fluids are added to such receptacles, the operation of the machine will cease when the salt concentrations in the two baths are equalized.

It will be noted that, in each of the embodiments illustrated in FIGURES 1 to 7, inclusive, the relative momenta produced about pulley wheels of different diameters are utilized for the production of movement of the macromolecular fibrous material relative to the chemical solutions or other fluids producing mechanical energy therefrom. Such devices are preferred since rotation of the fibrous bundles from bath to bath obviates the necessity for constant pumping of such fluids, simplifies feed mechanism requirements and reduces energy losses due to mixing of the respective reactant baths.

Alternatively, however, it may be desired in some applications to employ a mechanochemical engine in which the full contractile forces of the macromolecular materials are utilized, rather than merely the differential momenta produced about pulley members of differing diameters. In such instances, it is preferred to employ the form of the invention illustrated in FIGURES 8 and 9 of the drawings.

The embodiment of FIGURES 8 and 9 incorporates a plurality of working members 44 operably connected to a crankshaft assembly generally indicated at 45. Each of the working members comprises an outer cylindrical housing 46 provided with inlet and outlet lines 47 for feeding a pure water or dilute salt solution through the housing, and inlet and outlet lines 48 for alternately feeding a concentrated salt solution therethrough. The housing is vertically supported, as by a bracket 49, from a suitable stand 17b.

A macromolecular fibrous element 51, which is received within the housing 46 and extends lengthwise thereof, comprises a plurality of individual fiber elements 52, which are subject to periodic contraction and relaxation responsive to contact with the fluids sequentially fed through the housing 46.

The sequential contractions and relaxations of the individual fibers 52 of each element 51 are communicated to the crankshaft assembly 45 through a connecting element 53 passed over an auxiliary wheel 54 rotatably mounted to the stand 17b. The crankshaft is similarly rotatably mounted to the supporting stand and secured to the individual connecting elements 53 of the several working members 44 to facilitate continuous rotation of the output shaft element 55 thereof.

If desired, the solutions fed to each working member 44 may be sequentially fed through the successive working members by suitable automatic valving and switch mechanisms.

It will be understood that various changes may be made in the specific embodiments of the mechanochemical engine described hereinabove, without departing from the scope of the present invention. Hence, any of the numerous types of applicable macromolecular materials and actuating fluids may be used instead of the collagen and salt materials described. Similarly, greater power outputs may be achieved by varying the dimensions of the components of the devices and by varying the actuating fluids employed to make use of greater chemical free energy changes. Since these and other changes may be made, in accordance with the present invention, the preceding description is intended as illustrative and not in a limiting sense.

What is claimed is:

1. A device for effecting the direct conversion of chemical energy to mechanical energy, which comprises:
    (a) a source of a first fluid;
    (b) a source of a second fluid;
    (c) a working member comprising at least one polymeric linearly oriented element constituted of a sub-microscopic gel network of long chain molecules, such that when contacted by said first fluid, a first reversible dimensional change of said element is produced and, when contacted by said second fluid, a second reversible dimensional change thereof opposite in direction to said first dimensional change, is produced;
    (d) means for independently and intermittently contacting said polymeric element with said first and second fluids; and
    (e) means connected to said working member for converting the first and second oppositely directed dimensional changes of said polymeric element to continuous rotary motion and, conversely, for converting continuous rotary motion to said first and second dimensional changes, respectively.

2. The device as defined in claim 1, in which said polymeric, linearly oriented element comprises a porous, fibrous polymer constituted of a material selected from the group consisting of polyelectrolytes, reversibly meltable and crystallizable polymers, reversibly swellable polymers and polymers which reversibly change their dimensions upon chemical reaction.

3. The device as defined in claim 1, in which said polymeric, linearly oriented element comprises a membrane constituted of a material selected from the group consisting of polyelectrolytes, reversibly meltable and crystallizable polymers and polymers which reversibly change their dimensions upon chemical reaction.

4. The device as defined in claim 1, in which means (e) includes at least two rotatable pulley members having different diameters; and in which a plurality of polymeric, linearly oriented fibrous elements are wound endlessly on said pulley members such that, when said first reversible dimensional change occurs in each of said elements, a first torque is imparted to the smaller diameter pulley member and a second, larger torque is imparted to the larger diameter pulley member, resulting in a net torque effecting uni-directional movement of said elements on said pulley members and consequent uni-rotational movement of said members and, conversely, when said uni-rotational movement is imparted to said pulley members, said net torque and first reversible dimensional change are imparted to said polymeric elements.

5. The device as defined in claim 4,
    in which the means for independently and intermittently contacting the polymeric elements with said first and second fluids comprises first and second receptacles into which the first and second fluids, respectively, are introduced, and
    in which said endless polymeric fibrous elements are so disposed relative to said receptacles as to successively pass through the first and second fluids in the first and second receptacles, respectively.

6. The device as defined in claim 1,
    in which means (c) comprises at least two distinct polymeric, linearly oriented elements;
    in which means (d) comprises a housing for each of said elements, through which said fluids are successively passed; and
    in which means (e) comprises a crank shaft connected to each of said elements for converting the oppositely directed dimensional changes of said elements to rotary motion of the crank shaft and, conversely, for converting rotary motion of the crank shaft to the oppositely directed dimensional changes of said elements.

7. A device for effecting the direct conversion of chemical energy to mechanical energy, which comprises:
    (a) a first receptacle for a first fluid;
    (b) a second receptacle for a second fluid;
    (c) a working member comprising an endless fibrous element constituted of a linearly oriented polymeric substance having a sub-microscopic gel network of long chain molecules, such that when contacted by said first fluid, a first reversible dimensional change of said element is produced and, when contacted by said second fluid, a second reversible dimensional change thereof, opposite in direction to said first dimensional change, is produced;
    (d) means for passing said fibrous element sequentially through said first and second receptacles into contact with said first and second fluids, respectively, and for converting said dimensional changes to continuous rotary motion, said means including at least two pulley members having different diameters, such that said element, when subjected to said dimensional changes, produces a net moment about said pulley members effecting uni-directional movement of said element about the pulley members and concurrent unidirectional rotation of such members.

8. The device as defined in claim 7, in which said polymeric, linearly oriented element comprises a porous, fibrous polymer constituted of a material selected from the group consisting of polyelectrolytes, reversibly meltable and crystallizable polymers, reversibly swellable polymers, and polymers undergoing reversible reactions with corresponding dimensional change.

9. The device as defined in claim 8, in which said fibrous polymer is constituted of collagen, and in which said first and second fluids comprise aqueous solutions of lithium bromide having concentrations of from 0 to 12 Molar, respectively, the first, relatively concentrated lithium bromide solution effecting contraction of the collagen fibers when contacted therewith and the second, relatively dilute lithium bromide solution effecting relaxation of the collagen fibers when contacted therewith.

10. The device as defined in claim 8, in which said fibrous polymer is constituted of polymethacrylic acid, and in which said first fluid comprises an aqueous alkaline solution and said second fluid comprises an aqueous acidic solution, the alkaline solution effecting expansion of the polymethacrylic acid fibers when contacted therewith and the acid solution effecting contraction of the polymethacrylic acid fibers when contacted therewith.

11. The device as defined in claim 7, in which said polymeric, linearly oriented element comprises a porous membrane constituted of a material selected from the group consisting of polyelectrolytes, reversibly meltable and crystallizable polymers, reversibly swellable polymers, and other polymers reacting chemically with corresponding change in their dimensions.

12. A device for effecting the direct conversion of chemical energy to mechanical energy, which comprises;
 (a) a plurality of housings;
 (b) means for intermittently and sequentially feeding a first and second fluid through each of said housings;
 (c) a working member associated with each of said housings, each working member comprising a polymeric, linearly oriented element disposed within its associated housing and being constituted of a sub-microscopic gel network of long chain molecules, such that when contacted by said first fluid, a first reversible dimensional change of said element is produced and, when contacted by said second fluid, a second reversible dimensional change thereof, opposite in direction to said first dimensional change, is produced; and
 (d) a crank shaft disposed transversely of the respective housings and connected to one end of each of said elements for converting the oppositely directed dimensional changes of said elements to rotary motion of the crank shaft and, conversely, for converting rotary motion of the crank shaft to the oppositely directed dimensional changes, respectively.

No references cited.

EDGAR W. GEOGHEGAN, *Primary Examiner.*